US012124912B2

(12) United States Patent
Uchimura

(10) Patent No.: US 12,124,912 B2
(45) Date of Patent: Oct. 22, 2024

(54) ARTICLE REGISTRATION APPARATUS AND METHOD FOR READING ARTICLE INFORMATION BY A SECOND ANTENNA WHEN A READING RESULT FROM A FIRST ANTENNA SATISFIES A CRITERION

(71) Applicant: NEC Corporation, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/797,172

(22) PCT Filed: Feb. 5, 2021

(86) PCT No.: PCT/JP2021/004349
§ 371 (c)(1),
(2) Date: Aug. 3, 2022

(87) PCT Pub. No.: WO2021/161921
PCT Pub. Date: Aug. 19, 2021

(65) Prior Publication Data
US 2023/0055185 A1    Feb. 23, 2023

(30) Foreign Application Priority Data
Feb. 13, 2020   (JP) ................. 2020-022231

(51) Int. Cl.
*G06K 7/10*        (2006.01)
*G07G 1/00*        (2006.01)
(52) U.S. Cl.
CPC ..... *G06K 7/10356* (2013.01); *G06K 7/10465* (2013.01); *G07G 1/009* (2013.01)

(58) Field of Classification Search
None
See application file for complete search history.

(56) References Cited

U.S. PATENT DOCUMENTS

2020/0143121  A1*   5/2020   Sakurai ............... G07G 1/009

FOREIGN PATENT DOCUMENTS

| JP | 2015-207116 A | 11/2015 |
| JP | 2018-190255 A | 11/2018 |

(Continued)

OTHER PUBLICATIONS

International Search Report for PCT Application No. PCT/JP2021/004349, mailed on May 11, 2021.

*Primary Examiner* — Suezu Ellis
(74) *Attorney, Agent, or Firm* — Sughrue Mion, PLLC

(57) ABSTRACT

An article registration apparatus includes: a reading unit that reads article identification information from an IC tag associated with an article by using at least one of antennas; a control unit that controls the reading unit; a judgement unit; and a determination unit, wherein the control unit causes the reading unit to read the article identification information by using a first antenna, the judgement unit judges whether a reading result of the first antenna satisfies a criterion, the control unit causes the reading unit to read the article identification information by using a second antenna different from the first antenna when the reading result of the first antenna satisfies the criterion, and the determination unit determines the article identification information to be output, by using the article identification information read by using the first antenna and the second antenna.

20 Claims, 17 Drawing Sheets

(56) References Cited

FOREIGN PATENT DOCUMENTS

| JP | 2019-049841 A | 3/2019 |
| JP | 2019-087137 A | 6/2019 |
| JP | 2019-164529 A | 9/2019 |

\* cited by examiner

FIG. 9A

| ARTICLE CODE | SERIAL NO. |
|---|---|
| 12345 | 1234 |
| 12345 | 2345 |
| 98765 | 6789 |

FIG. 9B

| ARTICLE CODE | SERIAL NO. |
|---|---|
| 98765 | 4567 |
| 12345 | 5678 |

FIG. 9C

| ARTICLE CODE | SERIAL NO. |
|---|---|
| 12345 | 1234 |
| 12345 | 2345 |
| 12345 | 5678 |
| 98765 | 6789 |
| 98765 | 4567 |

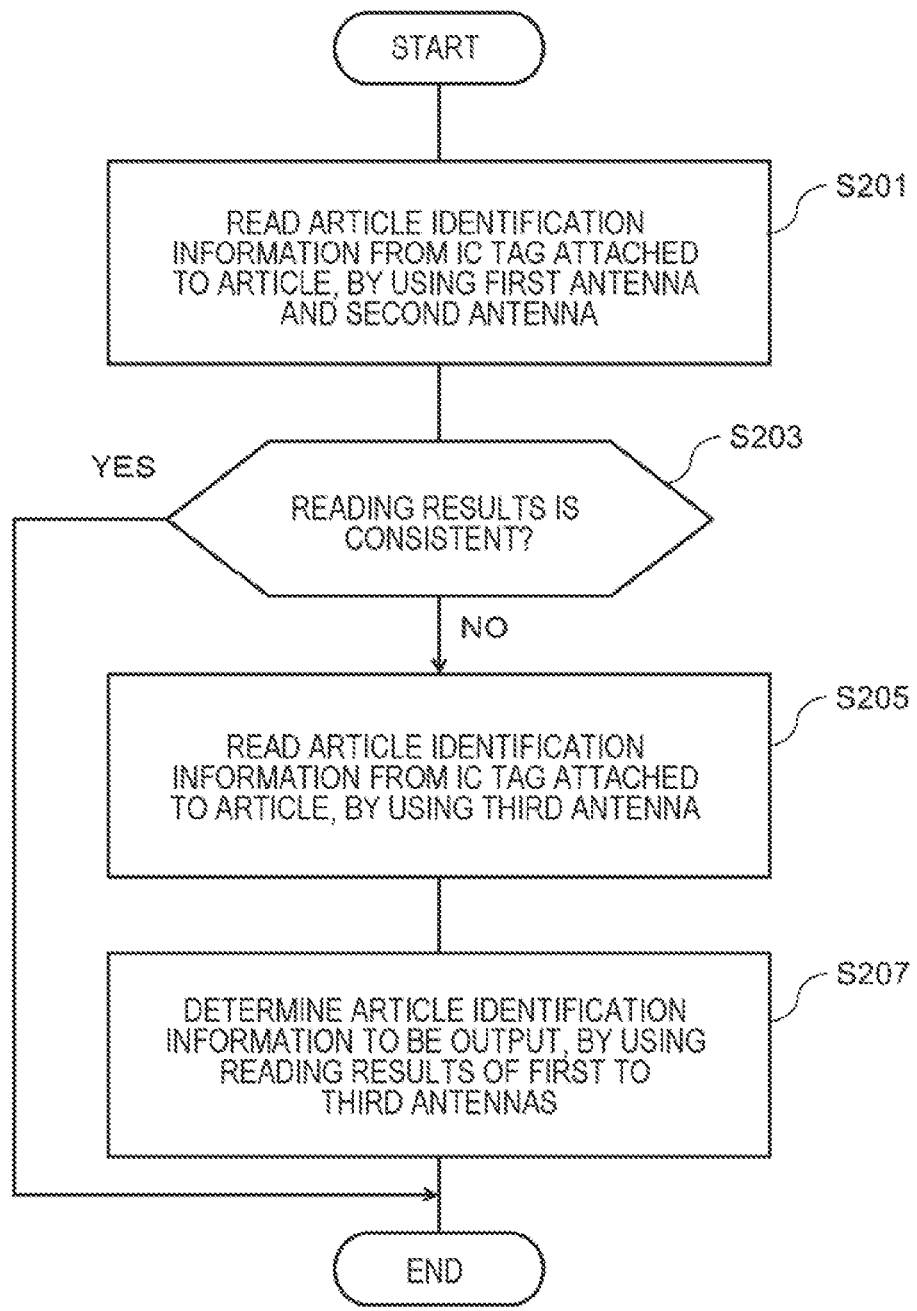

FIG. 11A

| ARTICLE CODE | SERIAL NO. |
|---|---|
| 12345 | 1234 |
| 12345 | 2345 |
| → 98765 | 6789 |

FIG. 11B

| ARTICLE CODE | SERIAL NO. |
|---|---|
| 12345 | 1234 |
| 12345 | 2345 |
| → 98765 | 4567 |

FIG. 11C

| ARTICLE CODE | SERIAL NO. |
|---|---|
| 12345 | 1234 |
| 12345 | 2345 |
| 98765 | 6789 |
| 98765 | 4567 |

FIG. 11D

| ARTICLE CODE | SERIAL NO. |
|---|---|
| 12345 | 1234 |
| 12345 | 2345 |
| 98765 | 6789 |
| 98765 | 4567 |

ARTICLE REGISTRATION APPARATUS AND METHOD FOR READING ARTICLE INFORMATION BY A SECOND ANTENNA WHEN A READING RESULT FROM A FIRST ANTENNA SATISFIES A CRITERION

This application is a National Stage Entry of PCT/JP2021/004349 filed on Feb. 5, 2021, which claims priority from Japanese Patent Application 2020-022231 filed on Feb. 13, 2020, the contents of all of which are incorporated herein by reference, in their entirety.

TECHNICAL FIELD

The present invention relates to an article registration apparatus, a data processing method thereof, and a program.

BACKGROUND ART

In recent years, self-checkout, where a customer operates an settlement apparatus for automatically reading product information from an integrated circuit (IC) tag attached to a product and registering the product, is starting to spread.

Patent Document 1 describes one example of an IC tag reading apparatus used in a self-checkout apparatus. The reading apparatus described in Patent Document 1 includes two or more antennas of an RFID reader arranged facing different radio-wave emission faces each other, and has an improved reading rate of an RFID tag associated with a product by emitting radio waves from different directions.

A reading apparatus of an accounting system described in Patent Document 2 includes an antenna that emits a radio wave for communicating with an RF tag and a shield part that 5 contains the antenna and has an opening formed wider than an article, and reads information from an RF tag while the shield part is opened. The shield part forming a containing part for containing an article can prevent a radio wave emitted from the antenna of the reading apparatus from spreading around the reading apparatus, and can reduce influence of the radio wave on another device.

Furthermore, the shield part is formed outside a radio wave absorption sheet in such a way that a radio wave reflection sheet surrounds radio wave absorption sheet. Thus, a weak radio wave leaking from the radio wave absorption sheet is reflected by the radio wave reflection sheet and absorbed inside the radio wave absorption sheet, and thereby the radio wave can be shielded. Consequently, in the reading apparatus, a communication region with an RF tag is limited to the containing part and thereabove, which prevents incorrectly reading tag information on an RF tag of another product located around the reading apparatus.

RELATED DOCUMENTS

Patent Documents

[Patent Document 1] Japanese Patent Application Publication No. 2019-87137
[Patent Document 2] Japanese Patent Application Publication No. 2018-190255

SUMMARY OF THE INVENTION

Technical Problem

The above-described reading apparatus described in Patent Document 1 has a high possibility of incorrectly reading a product that should not be originally read. Further, simultaneously driving a plurality of antennas for RFID reading of the reading apparatus may possibly increase power consumption or give influence on another peripheral device.

An IC tag is electrified by receiving a radio wave from a reader, and transmits information stored in a memory to the reader. An IC tag attached to a product or the like often has a sheet shape. Thus, when a face of a tag is oriented in parallel to an emission direction of a radio wave, the radio wave does not sufficiently hit an antenna of an IC tag, which disables the IC tag to be electrified to operate. Thus, there arises a possibility of occurrence of an unread IC tag. Further, when tags of a plurality of products lie on top of one another, radio waves replied from individual IC tags may interfere with and cancel each other.

The reading apparatus described in Patent Document 2 can prevent incorrectly reading a product that should not be originally read, but cannot prevent occurrence of a reading error in an IC tag as described above.

The present invention has been made in view of the above circumstance, and an object of the present invention is to provide a technique for improving accuracy in reading an IC tag associated with an article.

Solution to Problem

In each aspect of the present invention, following configurations are employed in order to solve the above-described problem.

A first aspect relates to an article registration apparatus.

A first article registration apparatus according to the first aspect is an article registration apparatus communicating with an integrated circuit (IC) tag associated with an article, including:

a reading unit that reads article identification information from the IC tag associated with the article by using at least one of a plurality of antennas;

a control unit that controls the reading unit;

a judgement unit that judges whether a reading result of the article identification information by the reading unit satisfies a criterion; and a determination unit that determines the article identification information read by the reading unit, wherein the control unit causes the reading unit to read the article identification information by using a first of the antenna, the judgement unit judges whether a reading result using the first antenna satisfies the criterion, the control unit causes the reading unit to read the article identification information by using a second antenna different from the first antenna when a reading result using the first antenna is judged as satisfying the criterion, and the determination unit determines the article identification information to be output, by using the article identification information read by using the first antenna and the article identification information read by using the second antenna.

A second article registration apparatus according to the first aspect is an article registration apparatus communicating with an IC tag associated with an article, including:

a reading unit that reads article identification information from the IC tag associated with the article by using a plurality of antennas;

a control unit that controls the reading unit;

a judgement unit that judges whether a reading result of the article identification information by the reading unit satisfies a criterion; and a determination unit that determines the article identification information read by the reading unit, wherein the control unit causes the reading unit to read the article identification information by using a first antenna and a second antenna, the judgement unit judges whether reading results of the first antenna and the second antenna are consistent with each other, the control unit causes the reading unit to end reading of the article identification information when the reading results are judged as consistent with each other, and causes the reading unit to read the article identification information further by using a third antenna when the reading results are judged as inconsistent with each other, and the determination unit determines the article identification information to be output, by using the article identification information read by using the first antenna, the second antenna, and the third antenna.

A second aspect relates to a data processing method of an article registration apparatus executed by at least one computer.

A first data processing method according to the second aspect includes:

by an article registration apparatus communicating with an integrated circuit (IC) tag associated with an article, including a reading unit that reads article identification information from the IC tag associated with the article by using at least one of a plurality of antennas;

by the article registration apparatus, causing the reading unit to read the article identification information by using a first of the antenna;

judging whether a reading result using the first antenna satisfies a criterion;

causing the reading unit to read the article identification information by using a second antenna different from the first antenna when a reading result using the first antenna is judged as satisfying the criterion; and determining the article identification information to be output, by using the article identification information read by using the first antenna and the article identification information read by using the second antenna.

A second data processing method according to the second aspect includes:

by an article registration apparatus communicating with an IC tag associated with an article, including a reading unit that reads article identification information from the IC tag associated with the article by using a plurality of antennas;

by the article registration apparatus, causing the reading unit to read the article identification information by using a first antenna and a second antenna;

judging whether reading results of the first antenna and the second antenna are consistent with each other;

causing the reading unit to end reading of the article identification information when the reading results are judged as consistent with each other;

causing the reading unit to read the article identification information further by using a third antenna when the reading results are judged as inconsistent with each other; and determining the article identification information to be output, by using the article identification information read by using the first antenna, the second antenna, and the third antenna.

Note that, another aspect of the present invention may be a program causing at least one computer to execute the method according to the above second aspect, or may be a computer-readable storage medium on which such a program is stored. The storage medium includes a non-transitory tangible medium.

The computer program includes a computer program code causing, when executed by a computer, the computer to perform, on an article registration apparatus, a data processing method thereof.

Note that, any combination of the above components and conversions of expression of the present invention among a method, an apparatus, a system, a storage medium, a computer program, and the like are also effective as a mode of the present invention.

Further, the various components of the present invention are not necessarily required to exist individually and independently, and a plurality of components may be formed as one member, one component may be formed by a plurality of members, a certain component may be a part of another component, a part of a certain component may overlap with a part of another component, or the like.

Further, while a plurality of procedures are described in order in the method and the computer program according to the present invention, execution order of the plurality of procedures is not limited to the described order. Thus, when the method and the computer program according to the present invention are performed, the order of the plurality of procedures can be changed, as far as the change does not detract from contents.

Furthermore, the plurality of procedures for the method and the computer program according to the present invention are not limited to being executed individually at different timings. Thus, another procedure may occur during execution of a certain procedure, an execution timing of a certain procedure may partly or wholly overlap with an execution timing of another procedure, or the like.

Advantageous Effects of Invention

According to each of the above aspects, a technique for improving accuracy in reading an IC tag associated with an article can be provided.

BRIEF DESCRIPTION OF THE DRAWINGS

FIGS. 9A to 9C are diagrams each illustrating an example of individual identification information read by each antenna.

FIG. 10 is a flowchart illustrating an operation example of the article registration apparatus according to the example embodiment.

FIGS. 11A to 11D are diagrams each illustrating an example of individual identification information read by each antenna.

DESCRIPTION OF EMBODIMENTS

Hereinafter, example embodiments of the present invention will be described by using the drawings. Note that, a similar component is assigned with a similar reference sign throughout all the drawings, and description therefor will be omitted as appropriate. Further, in each of the figures, a configuration of a part unrelated to the essence of the present invention is omitted and not illustrated.

"Acquisition" in the example embodiment includes at least one of fetching (active acquisition), by an own apparatus, data or information stored in another apparatus or storage medium and inputting (passive acquisition), to an own apparatus, data or information output from another apparatus. Examples of active acquisition include requesting or inquiring another apparatus to receive a reply therefrom, accessing another apparatus or storage medium to read out therefrom, and the like. Further, examples of passive acquisition include receiving delivered (transmitted, push-notified, or the like) information, and the like. Furthermore, "acquisition" may be selectively acquiring received data or information, or may be selectively receiving delivered data or information.

First Example Embodiment

<System Overview>

Figure 1A:
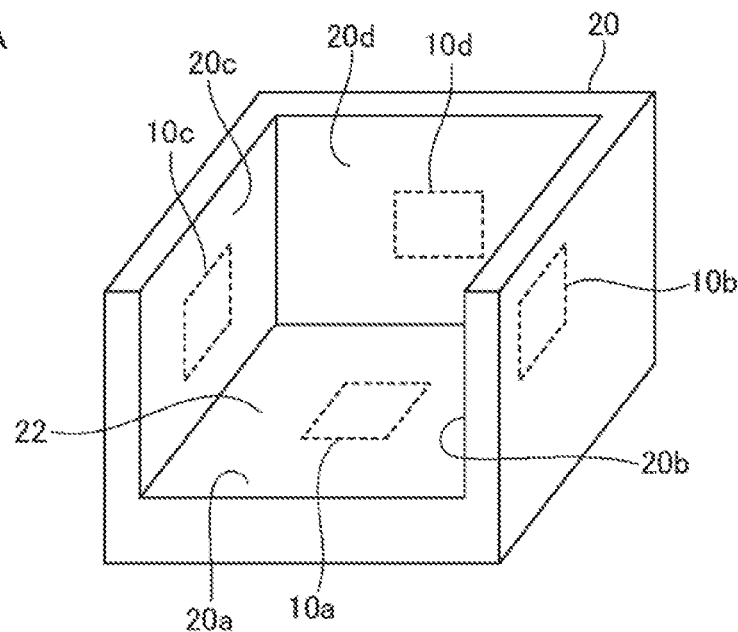
FIGS. 1A and 1B are diagrams for each describing an outline of a sales system according to an example embodiment.
Figure 1B:
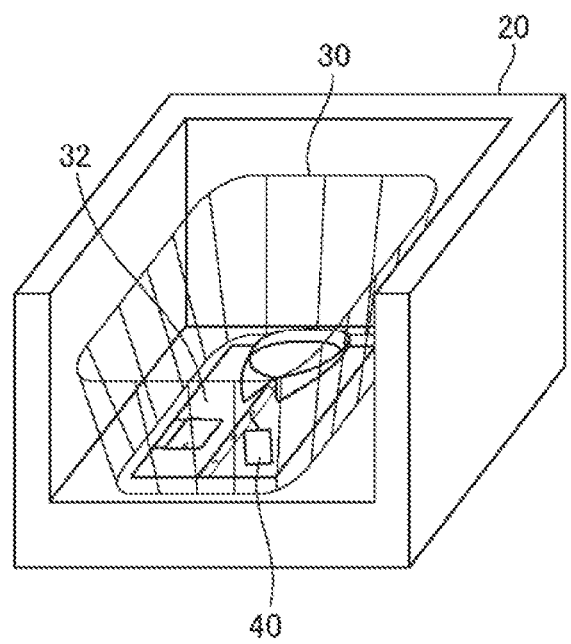

FIGS. 1A and 1B are diagrams for each describing an outline of a sales system according to an example embodiment of the present invention. The sales system automatically performs processing of registering a product to be purchased. A tag 40 that includes an IC tag storing article identification information such as a product code is associated in advance with each article 32. Associating the tag 40 and/or an IC tag 42 with the article 32 means tying or sticking the tag 40 and/or the IC tag 42 to the article 32, or embedding the tag 40 and/or the IC tag 42 in the article 32. The tag 40 and/or the IC tag 42 may be attached externally to the article 32, or may be embedded inside the article 32. In an example of the figure, the tag 40 including the IC tag 42 is tied to the article 32 with a string.

A timing for associating the tag 40 and/or the IC tag 42 with the article 32 is not particularly limited, and may be any time before displaying or before selling of the article 32, or another tag 40 and/or another IC tag 42 may be replaced after displaying or before settlement and re-associated with the article 32.

As illustrated in FIG. 1B, first, a customer puts the article 32 to be purchased in a shopping basket 30, and places the shopping basket 30 in an enclosure 20. However, the shopping basket 30 may be unnecessary, and the article 32 may be placed directly in the enclosure 20. By using a plurality of antennas (indicated as 10a, 10b, 10c, and 10d in the figure. Hereinafter, simply referred to as an antenna 10 unless particularly necessary to distinguish,) provided in the enclosure 20 illustrated in FIG. 1A, article identification information is read from the tag 40 associated with the article 32. The sales system performs product registration processing for the article 32, based on the read article identification information, and outputs settlement information to a settlement apparatus.

In the example in FIGS. 1A and 1B, the enclosure 20 includes a bottom face 20a on which the article 32 is placed and a recess 22 surrounded by three faces being right and left lateral faces 20b, 20c, and a back face 20d. The antenna 10a, the antenna 10b, the antenna 10c, and the antenna 10d are provided in sides of the respective faces. A shape of the enclosure 20 is one example, and is not limited thereto. In FIGS. 1A and 1B, a top face and a front face of the enclosure 20 are opened, but either the front face or the top face, or both faces may not be opened. The antenna 10 may be also provided in sides of the faces, or may not be provided. A lid may be provided to an opening part of the recess 22 of the enclosure 20, and the antenna 10 may be provided in sides of all faces of an internal space of the enclosure 20. Further, the number of antennas 10 provided in a side of each face is not limited to one by one. A plurality of antennas 10 may be arranged for one face.

The antenna 10 may be provided inside the enclosure 20, or may be provided on a surface of the lateral face.

Figure 2:
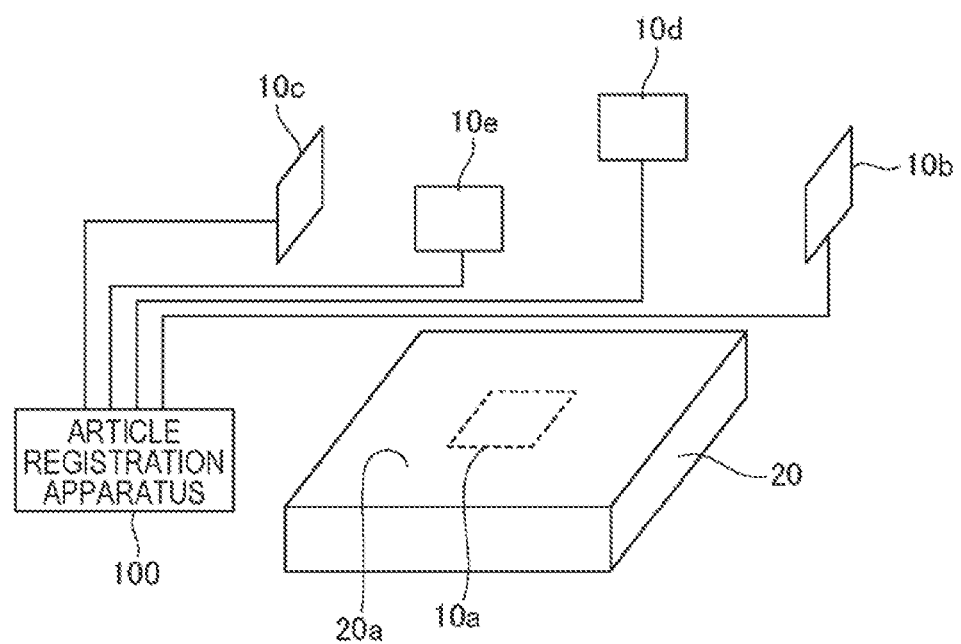
FIG. 2 is a diagram illustrating an arrangement example of a plurality of antennas used by an article registration apparatus.

As illustrated in FIG. 2, a plurality of antennas 10 may be provided at least under a placement position (the bottom face 20a of the enclosure 20) of the article 32 and in at least one side of lateral sides of the placement position of the article 32. In an example in FIG. 2, the enclosure 20 has a configuration including only the bottom face 20a with no lateral face. A first antenna (the antenna 10a) may be arranged on or under the bottom face 20a of the enclosure 20. Alternatively, the first antenna may be arranged at the placement position of the article 32 inside the enclosure 20. Furthermore, another antenna 10 is arranged, for example, on a wall, a ceiling, and the like of a store around the enclosure 20, in at least any one of lateral sides in four directions and an upper side of the enclosure 20. In the example in FIG. 2, no antenna is installed in an upper side, and four antennas 10b to 10e are arranged in four directions.

Figure 3:
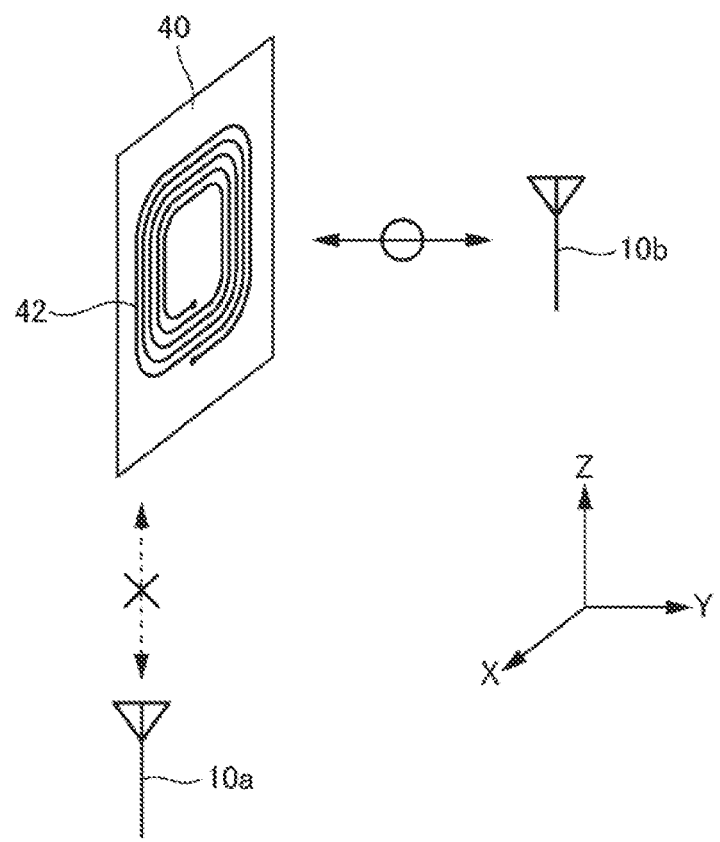
FIG. 3 is a diagram for describing a reading direction of an IC tag embedded in a tag and an antenna.

FIG. 3 is a diagram for describing a reading direction of the IC tag 42 embedded in the tag 40 and the antenna 10. In the present example embodiment, the tag 40 associated with the article 32 is, for example, a rectangular sheet, and the IC tag 42 is sandwiched and embedded between at least two sheets. Then, in the example in FIG. 1B, the tag 40 is attached to the article 32 by tying a string passed through a hole punched in a sheet to the article 32. In the figure, the IC tag 42 is drawn to be visible for illustrative purposes, but, in fact, the IC tag 42 may be in a state of being covered with a sheet and invisible from outside.

An antenna of the IC tag 42 embedded inside the sheet-shaped tag 40 has directivity. When a plane of a sheet of the tag 40 is on an X-Z plane, a radio wave emitted from the antenna 10b that faces the X-Z plane and is, for example, at a position distant in a Y-axis direction can be received by the antenna of the IC tag 42 from a front face, and thus, the antenna 10b and the IC tag 42 can communicate with each other. On the other hand, a radio wave emitted from the antenna 10a at a position distant in a Z-axis direction and/or an X-axis direction on the X-Z plane cannot be sufficiently received by the antenna of the IC tag 42, and the antenna 10a and the IC tag 42 cannot communicate with each other.

The tag 40 is attached to the article 32, and may be placed in any directions in the shopping basket 30 or the recess 22 of the enclosure 20. Further, there is also a possibility that a plurality of tags 40 may lie on top of one another. Thus, when the antenna 10 is provided in only one certain direction, there is also a possibility that an incommunicable IC tag 42 may exist. Thus, in the present example embodiment, a plurality of antennas 10 are arranged at different positions relative to the article 32 in such a way as to be communicable with the IC tag 42 of the tag 40 attached to the article 32 from different directions.

The shape of the IC tag 42 is not limited to a sheet shape, and may be various shapes such as a button type, a coin type, a card type, a stick type, and a seal type.

Figure 4:
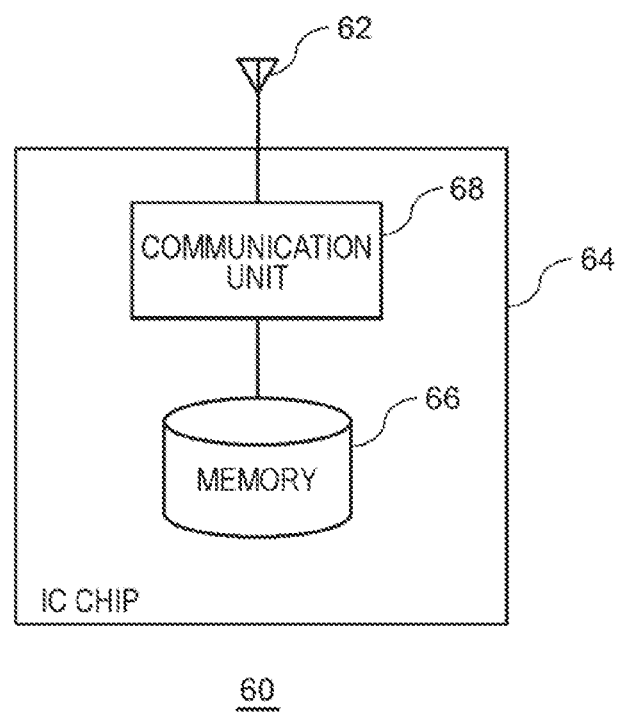
FIG. 4 is a function block diagram logically illustrating a configuration of an RFID tag according to the present example embodiment.

In the present example embodiment, the IC tag 42 is, for example, a radio frequency identification (RFID) tag 60. FIG. 4 is a function block diagram logically illustrating a configuration of the RFID tag 60 according to the present example embodiment. The RFID tag 60 includes an antenna 62 and an IC chip 64. The IC chip 64 includes a memory 66 and a communication unit 68. The communication unit 68 wirelessly communicates, via the antenna 62, with the antenna 10 of an apparatus (an article registration apparatus 100 in the present example embodiment) that reads the RFID tag 60. The memory 66 is a readable/writable memory device, and article identification information uniquely identifying the article 32 is written in the memory 66.

Figure 5:
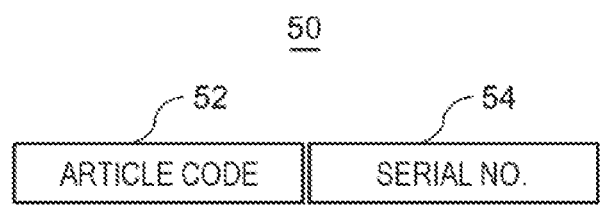
FIG. 5 is a diagram illustrating one example of a data structure of article identification information.

FIG. 5 is a diagram illustrating one example of a data structure of article identification information 50. The article identification information 50 includes at least an article code 52 and a serial number 54. The article code 52 is information identifying a kind of the article 32, and includes, for example, a product code. The serial number 54 is an individual number uniquely assigned to the article 32, and is information individually identifying the article 32. In other words, the articles 32 of a same kind have the same article code 52, and the individual articles 32 can be distinguished by the serial number 54. Information stored in the memory 66 of the RFID tag 60 is not limited thereto. Furthermore, header information, a manufacturer code, and the like may be included.

Function Configuration Example

Figure 6:
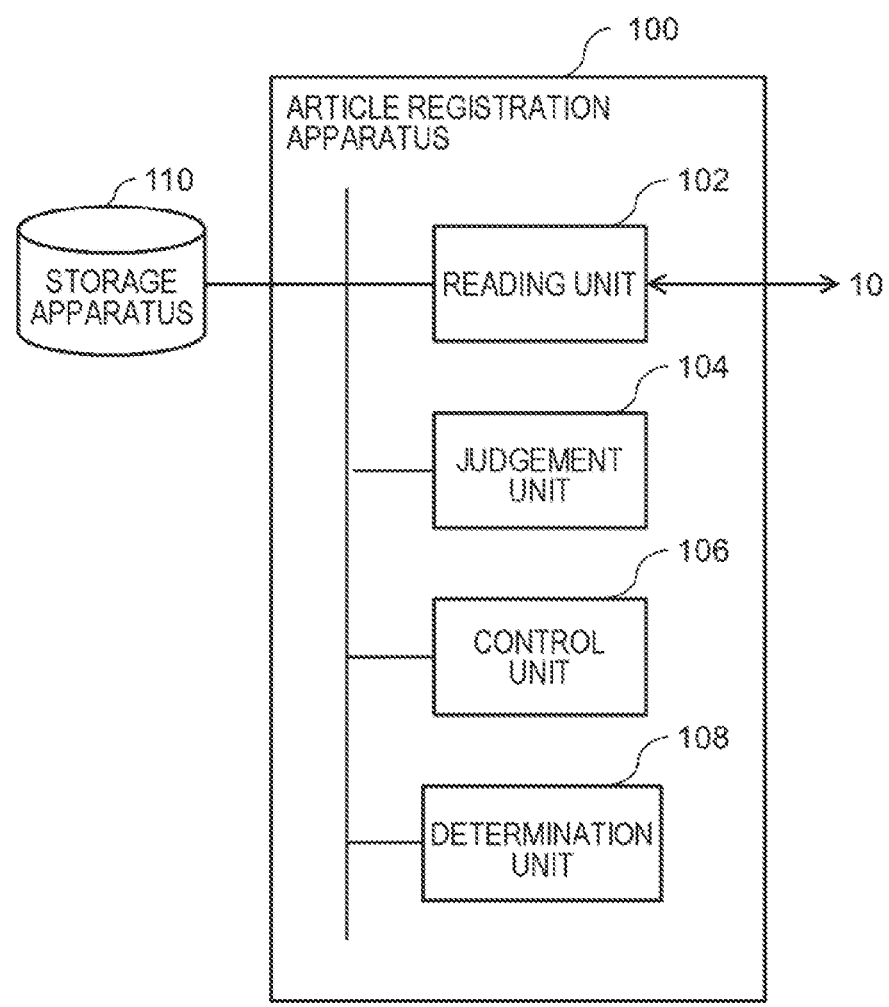
FIG. 6 is a function block diagram logically illustrating a configuration of the article registration apparatus according to the example embodiment.

FIG. 6 is a function block diagram logically illustrating a configuration of the article registration apparatus 100 according to the example embodiment of the present invention. The article registration apparatus 100 communicates with the IC tag 42 associated with the article 32. The article registration apparatus 100 includes a reading unit 102, a judgement unit 104, a control unit 106, and a determination unit 108.

The article registration apparatus 100 further includes a storage apparatus 110. The storage apparatus 110 stores various kinds of setting data, a program, and the like of the article registration apparatus 100. The storage apparatus 110 may be provided inside the article registration apparatus 100, or may be provided outside. In other words, the storage apparatus 110 may be hardware integrated with the article registration apparatus 100, or may be hardware separate from the article registration apparatus 100. The article registration apparatus 100 and the storage apparatus 110 may be connected through a communication network.

The reading unit 102 reads the article identification information 50 from the IC tag 42 associated with the article 32 by using at least one of a plurality of antennas 10.

Specifically, the reading unit 102 emits a radio wave via the antenna 10. In the present example embodiment, the RFID tag 60 of a passive reflection type is used, but is not limited thereto. For example, the RFID tag 60 may be a battery-mounted type, or may be a type using light rather than an electromagnetic wave. Upon receiving the radio wave via the antenna 62, the communication unit 68 of the RFID tag 60 is electrified, reads out the article identification information 50 stored in the memory 66, and emits a carrier wave carrying the read article identification information 50. The reading unit 102 receives, via the antenna 10, the carrier wave sent from the RFID tag 60, and acquires the article identification information 50.

The control unit 106 controls the reading unit 102. The judgement unit 104 judges whether a reading result of the article identification information 50 by the reading unit 102 satisfies a criterion. The determination unit 108 determines the article identification information 50 to be output, by using the article identification information 50 read by the reading unit 102.

The control unit 106 causes the reading unit 102 to read the article identification information 50 by using a first antenna. Then, the judgement unit 104 judges whether a reading result using the first antenna satisfies a criterion. Furthermore, when it is judged that the reading result using the first antenna satisfies the criterion, the control unit 106 causes the reading unit 102 to read the article identification information 50 from the IC tag 42 by using a second antenna different from the first antenna. Then, the determination unit 108 determines the article identification information 50 to be output, by using the article identification information 50 read by using the first antenna and the article identification information 50 read by using the second antenna.

For example, the first antenna is the antenna 10a provided in a side of the bottom face 20a of the enclosure 20 in FIG. 1A. Then, the second antenna is at least one of the antenna 10b, the antenna 10c, and the antenna 10d provided in sides of the both lateral faces 20b, 20c, and the back face 20d of the enclosure 20 in FIG. 1A. In other words, the first antenna and the second antenna are arranged at positions for emitting radio waves from mutually different directions toward the article 32 placed on the bottom face 20a of the enclosure 20.

This allows reading to be executed again from another direction, even when orientation of the antenna 62 of the RFID tag 60 relative to the antenna 10 is not a direction suitable for reading. Thus, even when reading of the RFID tag 60 using the first antenna is failed, there is a possibility that the RFID tag 60 may be read by the second antenna, which improves accuracy in reading the RFID tag 60.

The reading unit 102 reads at least the article code 52 of the article identification information 50. The reading unit 102 wirelessly communicates with the antenna 62 of the RFID tag 60 by using a plurality of antennas 10 described in FIGS. 1A and 1B, and reads out the article identification information 50 from the memory 66 of the RFID tag 60. A criterion on the article identification information 50 includes that, for example, among a plurality of pieces of the article identification information 50 read by using the first antenna, at least two pieces of the article identification information 50 have the identical article code 52. In other words, when at least two products of a same kind are found as a result of reading using the first antenna, use of the criterion allows retrying of reading of the article identification information 50 using the second antenna capable of emitting a radio wave from another direction, in order to acquire the number of the products more accurately.

Alternatively, an input of the number of the articles 32 may be accepted in advance from a user, and the criterion may be that the input number is not consistent with the number of pieces of the article identification information 50. A conceivable cause for inconsistency in the number is, for example, occurrence of the unread article identification information 50, or an erroneous or dishonest input of the number.

Hardware Configuration Example

Figure 7:
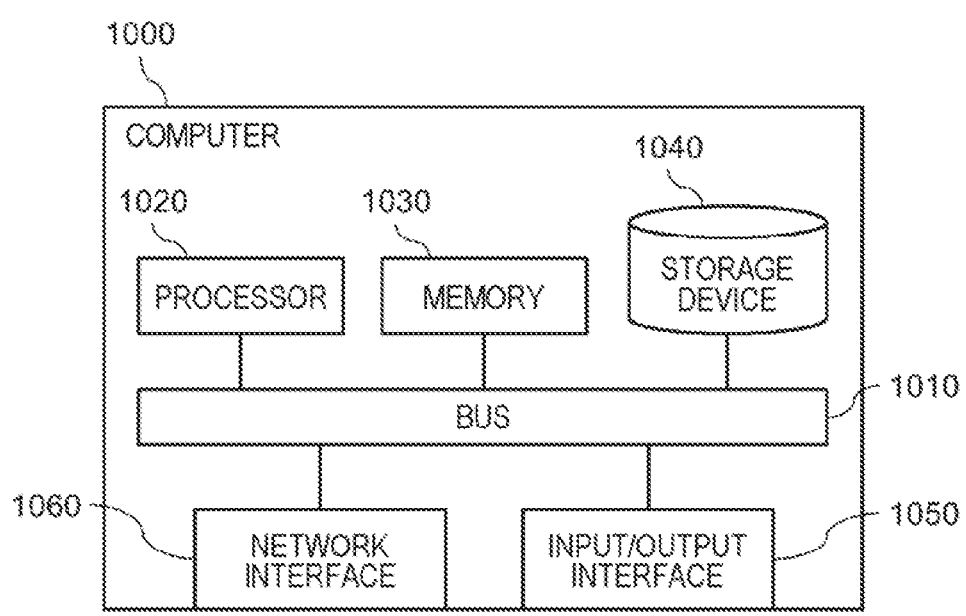
FIG. 7 is a block diagram illustrating a hardware configuration of a computer achieving the article registration apparatus illustrated in FIG. 6.

FIG. 7 is a block diagram illustrating a hardware configuration of a computer 1000 achieving the article registration apparatus 100 illustrated in FIG. 6. The computer 1000 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from one another. However, a method of connecting the processor 1020 and the like with one another is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module achieving each function (for example, the reading unit 102, the judgement unit 104, the control unit 106, the determination unit 108, and the like) of the article registration apparatus 100. Each of the program modules is read into the memory 1030 and executed by the processor 1020, and thereby each function relevant to the program module is achieved. Further, the storage device 1040 may store each piece of data of the storage apparatus 110.

A program module may be stored in a storage medium. A storage medium for storing a program module includes a non-transitory tangible medium usable by the computer 1000, and a program code readable by the computer 1000 (the processor 1020) may be embedded in the medium.

The input/output interface 1050 is an interface for connecting the computer 1000 to various types of input/output devices.

The network interface 1060 is an interface for connecting the computer 1000 to a communication network. The communication network is, for example, a local area network (LAN) or a wide area network (WAN). A method by which the network interface 1060 connects to the communication network may be wireless connection, or may be wired connection.

Then, the computer 1000 connects to necessary devices (for example, the antenna 10, a display, a keyboard, a mouse, a printer, a speaker, a microphone, and the like) via the input/output interface 1050 or the network interface 1060.

The article registration apparatus 100 is achieved by installing, on the computer 1000, an application program for achieving the article registration apparatus 100 and activating the
application program.

The computer 1000 may be provided as a dedicated apparatus to the enclosure 20, may be a general-purpose personal computer installed at a place where the enclosure 20 is installed, or may be a server installed at a remote place and connected to the antenna 10 of the enclosure 20 via a communication network such as the Internet. Further, a plurality of computers 1000 may be used in combination, and the functions of the article registration apparatus 100 may be shared in each computers 1000.

Further, as will be described later, the article registration apparatus 100 may be achieved by a computer achieving an article registration apparatus and/or a settlement apparatus in a sales system 1. In other words, the article registration apparatus and/or the settlement apparatus and the article registration apparatus 100 may be achieved by an integrated computer.

Operation Example

Figure 8:
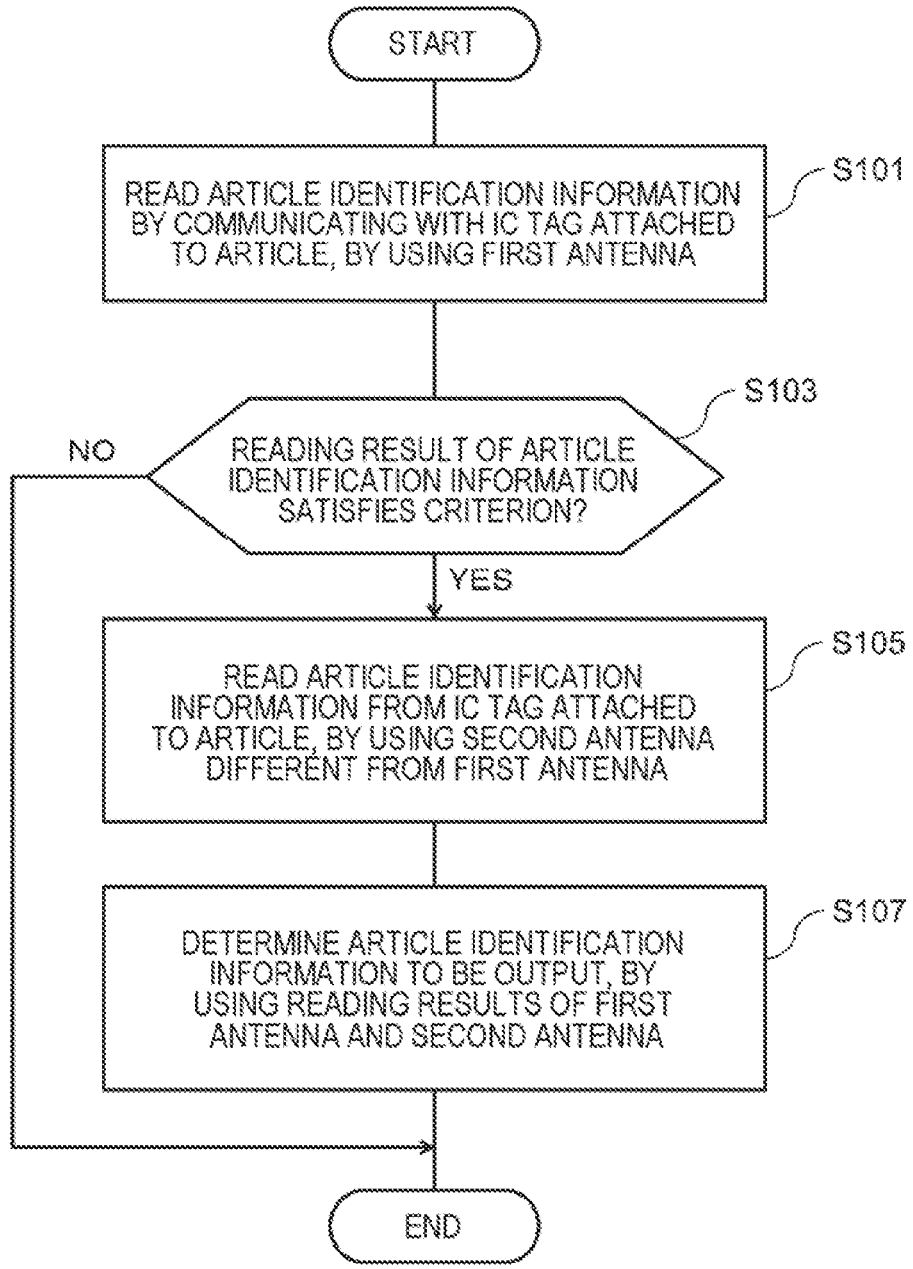
FIG. 8 is a flowchart illustrating an operation example of the article registration apparatus according to the example embodiment.

FIG. 8 is a flowchart illustrating an operation example of the article registration apparatus 100 according to the present example embodiment.

First, the control unit 106 causes the reading unit 102 to attempt to communicate, by using the antenna 10a (a first antenna) arranged in the bottom face 20a of the enclosure 20, with the RFID tag 60 associated with the article 32 placed on the bottom face 20a of the enclosure 20, and causes to read the article identification information 50 from the RFID tag 60 (step S101).

The judgement unit 104 judges whether a reading result of the article identification information 50 by the reading unit 102 satisfies a criterion (step S103). Herein, the criterion is that at least two of a plurality of pieces of the article identification information 50 read by using the first antenna have the identical article code 52. In other words, when the same articles 32 are detected, reading is retried by using another antenna. This is also applicable when the same articles 32 are purchased in large quantities such as binge shopping, and the like.

In FIG. 9A, since pieces of the article identification information 50 having the identical article code 52 (having the same article code 52 "12345") are included (YES in step S103), the control unit 106 next causes the reading unit 102 to attempt to communicate with the RFID tag 60 associated with the article 32 by using a second antenna different from the first antenna (the antenna 10a), and causes to read the article identification information 50 from the RFID tag 60 (step S105). Herein, among a plurality of antennas 10, the second antenna is any one of the antennas 10b to 10e (FIG. 2) installed in lateral sides and a top side of a placement position of the article 32.

The second antenna is preferably an antenna that emits a radio wave to the article 32 (the RFID tag 60) from a direction different from the first antenna. Herein, the antenna 10b is used as the second antenna. Consequently, the reading unit 102 acquires the article identification information 50 in FIG. 9B. In this example, the article identification information 50 that is not acquired by the first antenna in FIG. 9A is acquired.

The determination unit 108 determines the article identification information 50 to be output, by using a plurality of pieces of the article identification information 50 read by each of the first antenna and the second antenna (step S107). Herein, a plurality of pieces of the article identification information 50 in FIG. 9C are determined by taking a logical sum of the plurality of pieces of the article identification information 50 read by the first antenna and the second antenna.

On the other hand, when the article identification information 50 does not satisfy the criterion in step S103 (No in step S103), the determination unit 108 employs the article identification information 50 read by the first antenna as a correct reading result, outputs the determined article identification information 50, and ends the present processing.

As described above, according to the present example embodiment, the control unit 106 first causes to read the article identification information 50 from the IC tag 42 associated with the article 32 by using a first antenna, and thereafter causes to read the article identification information 50 again from the IC tag 42 associated with the article 32 by using a second antenna different from the first antenna when a criterion is satisfied.

This allows reading of the IC tag 42 to be performed by using the second antenna that can emit a radio wave from a direction different from the first antenna even when the IC tag 42 is arranged in parallel to an emission direction of a radio wave of the first antenna, and thus, the IC tag 42 that cannot be read by the first antenna can be read by the second antenna with an increased possibility.

In other words, the IC tag 42 being unread by the first antenna can be read by the second antenna with an increased possibility. When the IC tag 42 is read by using the antenna 10, reading is preferably completed by one antenna 10, if possible, from a point of view of saving power consumption or preventing emission of an unnecessary radio wave as much as possible. However, because of a characteristic of the IC tag 42 as described above, there is a possibility of occurrence of an unread IC tag in reading from one direction.

Thus, the present example embodiment executes reading of the article identification information 50 from the IC tag 42 again by using the second antenna that emits a radio wave from a direction different from the first antenna, only when a criterion is satisfied based on a reading result of the first antenna. In other words, a plurality of antennas 10 can be used only when necessary, rather than a plurality of antennas 10 are used more than is needed. This increases a possibility that the IC tag 42 unread by the first antenna can be read by the second antenna, and improves accuracy in reading.

The present example embodiment uses, as a criterion for retrying reading, that pieces of the article identification information 50 have the same article code 52. In other words, when products of a same kind are included in products to be purchased, the present example embodiment can perform reading using another antenna in order to accurately count the number of the products. This can improve accuracy in reading.

Second Example Embodiment

An article registration apparatus 100 according to a present example embodiment has a configuration similar to the article registration apparatus 100 according to the above example embodiment, but operates differently. Thus, description will be given by using the function block diagram in FIG. 6 of the article registration apparatus 100 according to the first example embodiment.

The article registration apparatus 100 according to the present example embodiment is, similar to the above example embodiment except for a point that article identification information 50 is read from an IC tag 42 first by using two antennas 10 (a first antenna and a second antenna) and thereafter the article identification information 50 is read again by using a third antenna when reading results of the two antennas 10 are not consistent with each other.

Function Configuration Example

In the present example embodiment, a control unit 106 causes a reading unit 102 to read the article identification information 50 from the IC tag 42 by using a first antenna and a second antenna of a plurality of antennas 10. However, the two antennas 10 preferably execute reading at shifted timings in a time division manner, rather than perform reading simultaneously. This is because of a possibility of interference between radio waves upon simultaneous emission of radio waves from the two antennas 10. The interference between radio waves can be prevented by shifting operation timings of the two antennas 10.

Herein, the first antenna is an antenna 10a in FIG. 1A, and the second antenna is any one of antennas 10b to 10d in FIG. 1A. Herein, the second antenna is the antenna 10b. The antenna 10a as the first antenna and the antenna 10b as the second antenna are arranged at positions for emitting radio waves from different directions toward an article 32 placed on a bottom face 20a of an enclosure 20.

A judgement unit 104 judges whether reading results of the first antenna and the second antenna are consistent with each other. When the reading results are judged as consistent by the judgement unit 104, the control unit 106 causes the reading unit 102 to end reading of the article identification information 50. Furthermore, when the reading results are judged as inconsistent, the control unit 106 causes the reading unit 102 to read the article identification information 50 from the IC tag 42 further by using a third antenna.

The third antenna is arranged at a position for emitting a radio wave from a direction different from the first antenna and the second antenna toward the article 32 placed on the bottom face 20a of the enclosure 20. Herein, the third antenna is the antenna 10d in FIG. 1A.

A determination unit 108 determines the article identification information 50 to be output, by using the article identification information 50 read by using the first antenna, the second antenna, and the third antenna. It is assumed that the article identification information 50 illustrated in FIG. 11A is read by the first antenna and the article identification information 50 illustrated in FIG. 11B is read by the second antenna. In this example, a serial number 54 of the third piece of article identification information 50 is different between a reading result by the first antenna in FIG. 11A and a reading result by the second antenna in FIG. 11B.

The judgement unit 104 judges that the reading results are not consistent between the first antenna and the second antenna, and the control unit 106 causes the reading unit 102 to read the article identification information 50 by using the third antenna. Then, it is assumed that the article identification information 50 illustrated in FIG. 11C is read by the third antenna.

The determination unit 108 employs a reading result of the third antenna because the reading result of the third antenna is consistent with a logical sum of the reading results of the first antenna and the second antenna, and determines the article identification information 50 in FIG. 11D as the article identification information 50 to be output.

Operation Example

FIG. 10 is a flowchart illustrating an operation example of the article registration apparatus 100 according to the present example embodiment. First, the control unit 106 causes the reading unit 102 to read the article identification information 50 from the IC tag 42 associated with the article 32 by using first and second antennas (for example, the antenna 10a and the antenna 10b) (step S201).

Then, the judgement unit 104 judges whether reading results by the first antenna and the second antenna are consistent with each other (step S203). When the reading results are consistent (YES in step S203), the determination unit 108 employs the article identification information 50 read by using the first antenna as a correct reading result, outputs the determined article identification information 50, and ends the present processing.

When the reading results are not consistent (NO in step S203), the control unit 106 causes the reading unit 102 to read the article identification information 50 of the IC tag 42 associated with the article 32 again by using a third antenna different from the first antenna and the second antenna (step S205).

Then, the determination unit 108 determines the article identification information 50 to be output, by using reading results of the first to third antennas (step S207). As described above, herein, the article identification information 50 in FIG. 11D is determined and output.

In step S207, when the reading result of the third antenna is a result further different from the first antenna and the second antenna, the control unit 106 may cause the reading unit 102 to read the article identification information 50 again from the IC tag 42 further by using a fourth antenna different from the first to third antennas. Then, the determination unit 108 may determine the article identification information 50 to be output, by using reading results of the first to fourth antennas. For example, the determination unit 108 may determine the article identification information 50 to be output, by taking a logical sum of a plurality of pieces of the article identification information 50 read by the first to fourth antennas.

In this manner, by sequentially changing the antennas 10 for use in reading, radio waves can be emitted from different directions toward the article 32 placed on the enclosure 20, and the article identification information 50 can be read from the IC tag 42. This can reduce the unread IC tag 42 even when a plurality of IC tags 42 are placed with random orientation. Further, reading is performed by sequentially using the antennas 10 of different directions, and thus, radio waves emitted from different directions can be also prevented from interfering with each other.

According to the present example embodiment, the article identification information 50 is read from the IC tag 42 associated with the article 32 by using two of a plurality of antennas 10 that are arranged at positions having different radio wave emission directions relative to a placement place of the article 32, and, when pieces of the article identification information 50 read by using the two antenna 10 are not consistent with each other, a third antenna capable of emitting a radio wave from another direction is further used to perform reading.

This allows the reading unit 102 to read the article identification information 50 from the IC tag 42 by using two antennas 10 capable of emitting radio waves from different directions when there are a plurality of IC tags 42 facing different directions, which increases a probability that reading may succeed with at least one of the antennas 10. Then, when reading results of the two antennas 10 are not consistent with each other, accuracy in reading can be increased by further using a reading result by the third antenna.

Third Example Embodiment

Figure 12:
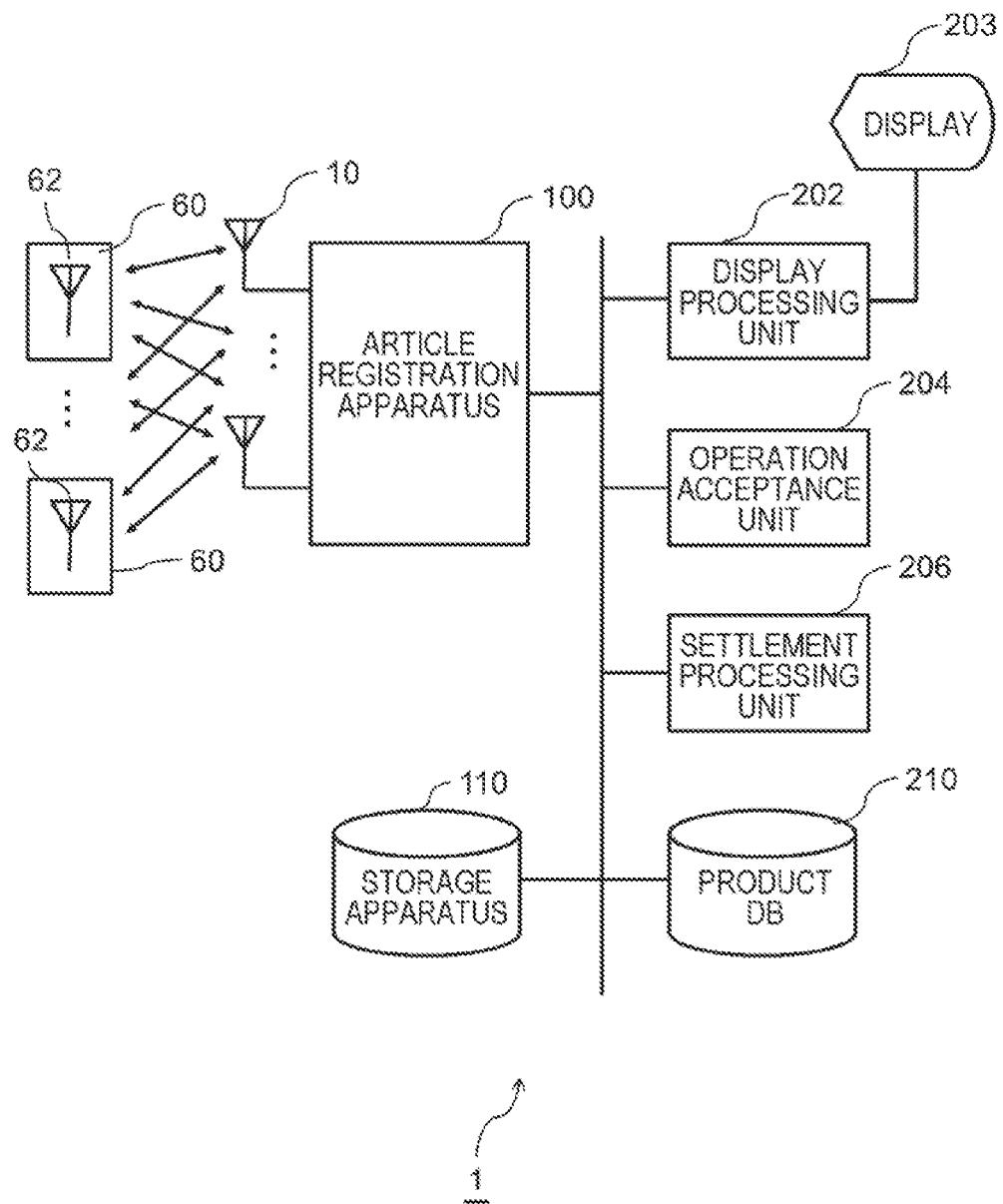
FIG. 12 is a function block diagram illustrating a logical configuration example of the sales system according to the example embodiment.

FIG. 12 is a function block diagram illustrating a logical configuration example of a sales system 1 according to a present example embodiment. The sales system 1 according to the present example embodiment performs product registration processing by using the article registration apparatus 100 according to the first example embodiment or the second example embodiment described above, and transmits settlement information to a settlement apparatus.

The sales system 1 includes an article registration apparatus 100, a display processing unit 202, an operation acceptance unit 204, a settlement processing unit 206, and a product DB 210.

The display processing unit 202 causes a display to display a screen where a user such as a customer checks a product to be purchased, based on article identification information 50 read by the article registration apparatus 100. The operation acceptance unit 204 accepts an operation from a user who uses the screen displayed on the display. The settlement processing unit 206 acquires, based on the article identification information 50 read by the article registration apparatus 100, a product name and a price of the product from the product DB 210, generates settlement information, and transmits the settlement information to an settlement apparatus (not illustrated).

Operation Example

Figure 13:
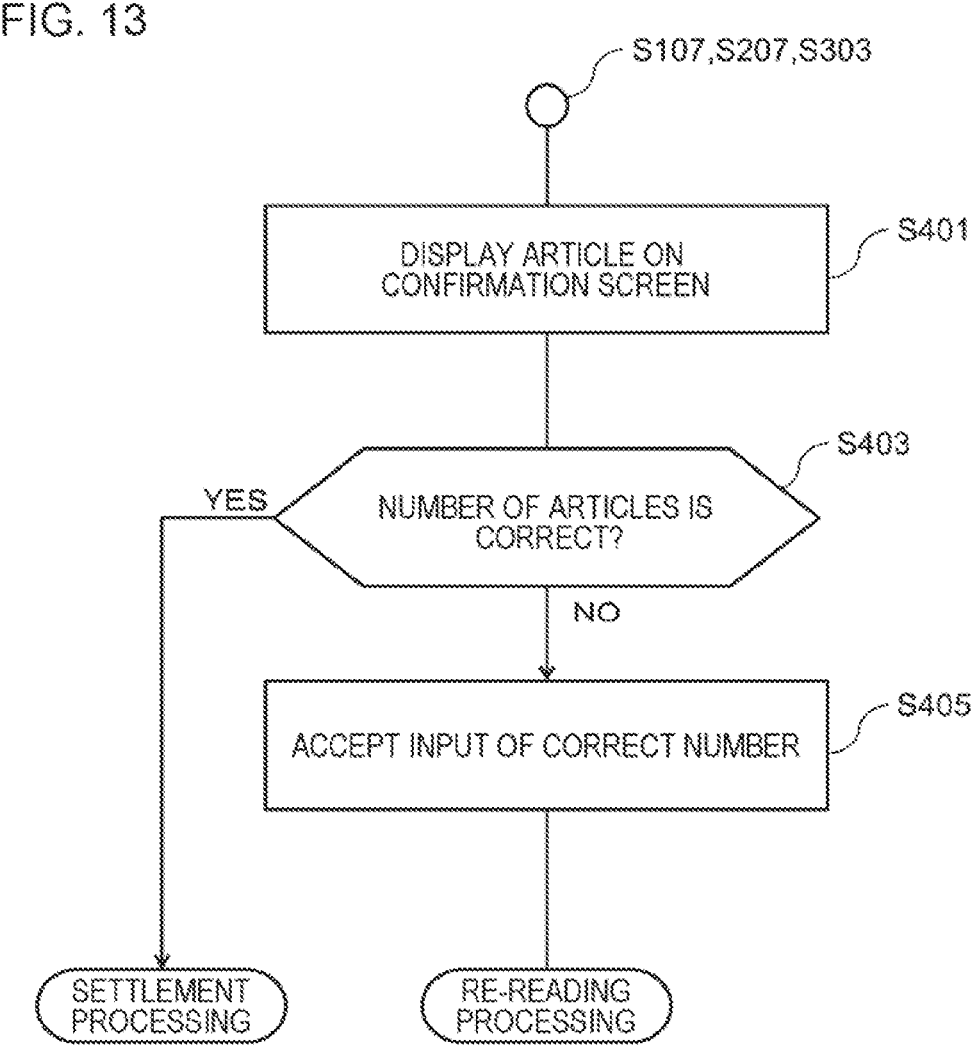
FIG. 13 is a flowchart illustrating an operation example of the sales system according to the example embodiment.

FIG. 13 is a flowchart illustrating an operation example of the sales system 1 according to the present example embodiment. The operation flow starts after the article identification information 50 is determined (step S107 in FIG. 8, step S207 in FIG. 10, step S303 in FIG. 16 to be described later, and step S207 in FIG. 17 to be described later) in the operation flow of the article registration apparatus 100 according to another example embodiment.

First, the display processing unit 202 displays a confirmation screen 300 on a display 203 (step S401). The display 203 is, for example, a touch panel-type liquid crystal display. For the display 203, a tablet terminal, a smartphone, or the like may be used.

Figure 14:
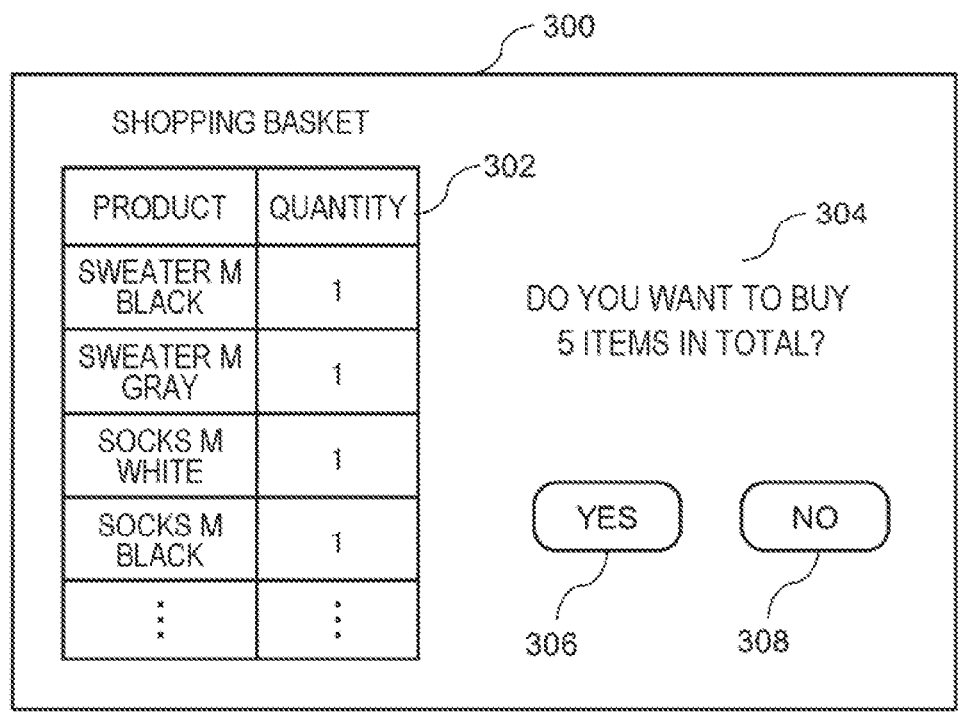
FIG. 14 is a diagram illustrating one example of a confirmation screen.

FIG. 14 is a diagram illustrating one example of the confirmation screen 300 displayed by the display processing unit 202. The confirmation screen 300 includes a product list 302, a number-of-items confirmation message display section 304, a YES button 306, and a NO button 308. The product list 302 includes at least a product name and quantity of products acquired by the settlement processing unit 206, based on the article identification information 50 determined by the article registration apparatus 100. A price of a product, a total amount of payment, and the like may be included.

The number-of-items confirmation message display section 304 displays the number of pieces of the article identification information 50 determined by the article registration apparatus 100, together with a message prompting a user to confirm the number of items. The YES button 306 and the NO button 308 are operation buttons for causing a user to input a result of confirming the number of items.

Returning to FIG. 13, when the operation acceptance unit 204 accepts a depression of the YES button 306 (YES in step S403), the settlement processing unit 206 transmits settlement information to a settlement apparatus, and causes to perform settlement processing. The settlement processing is not particularly limited, and thus, description therefor will be omitted herein.

When the operation acceptance unit 204 accepts a depression of the NO button 308 (NO in step S403), the display processing unit 202 causes a display to display a number-of-items input screen 320, and the operation acceptance unit 204 accepts an input of a correct number of items (step S405).

Figure 15:
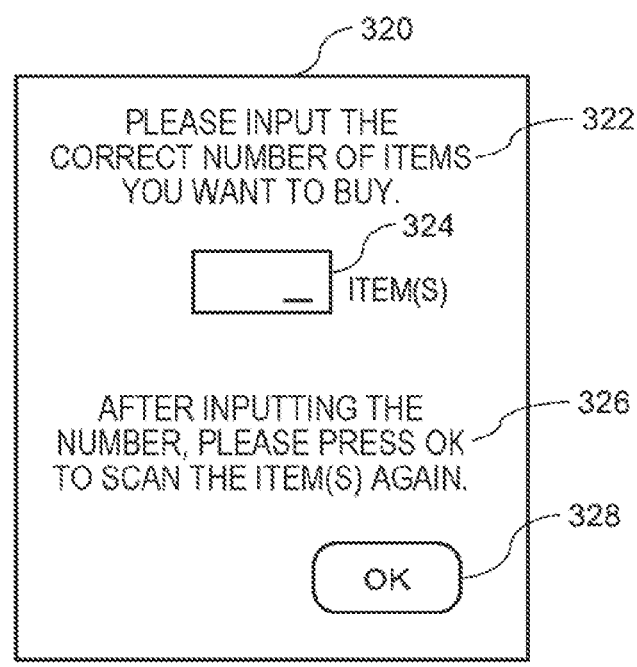
FIG. 15 is a diagram illustrating one example of a number-of-items input screen.

FIG. 15 is a diagram illustrating one example of the number-of-items input screen 320. The number-of-items input screen 320 includes an input instruction display section 322, a number-of-items input section 324, an input confirmation message display section 326, and an OK button 328. The input instruction display section 322 displays a message prompting a user to input a correct number of items. The number-of-items input section 324 is a text box or the like where an input of the number of items from a user is accepted. Alternatively, the number-of-items input section 324 may be a drumroll-type user interface (UI) for selecting the number of items. The input confirmation message display section 326 displays a message prompting a user to depress the OK button 328 after an input of the number of items. The OK button 328 is an operation button for accepting a confirmation operation after an input of the number of items from a user.

Returning to FIG. 13, when a user inputs a correct number of items on the number-of-items input screen 320 and depresses the OK button 328, the operation acceptance unit 204 accepts the input of the number of items (step S405).

Then, based on the input number of items, the control unit 106 causes the reading unit 102 to read the article identification information 50 again from an IC tag 42. The reading processing may be performed by any procedure described in each of the example embodiments. At this time, for example, a guidance such as a message or an image instructing a user to change orientation of an article 32 or re-place the article 32 may be output before re-reading.

In re-reading processing, a first antenna is preferably an antenna 10a positioned under a placement place of the article 32. Furthermore, in re-reading processing, it is preferable to use, as second and third antennas, antennas other than antennas used as second and third antennas in first reading. This is because there is a possibility that the unread IC tag 42 can be read by reading the article identification information 50 from the IC tag 42 from a direction different from a first time.

According to the present example embodiment, a configuration is made in which a user is provided with and caused to check a reading result of the IC tag 42, and thus, reading can be performed again when a read error occurs. Thus, accuracy in reading is improved.

While the example embodiments of the present invention have been described with reference to the drawings, the example embodiments are exemplification of the present invention, and various configurations other than the above can be employed.

Figure 16:
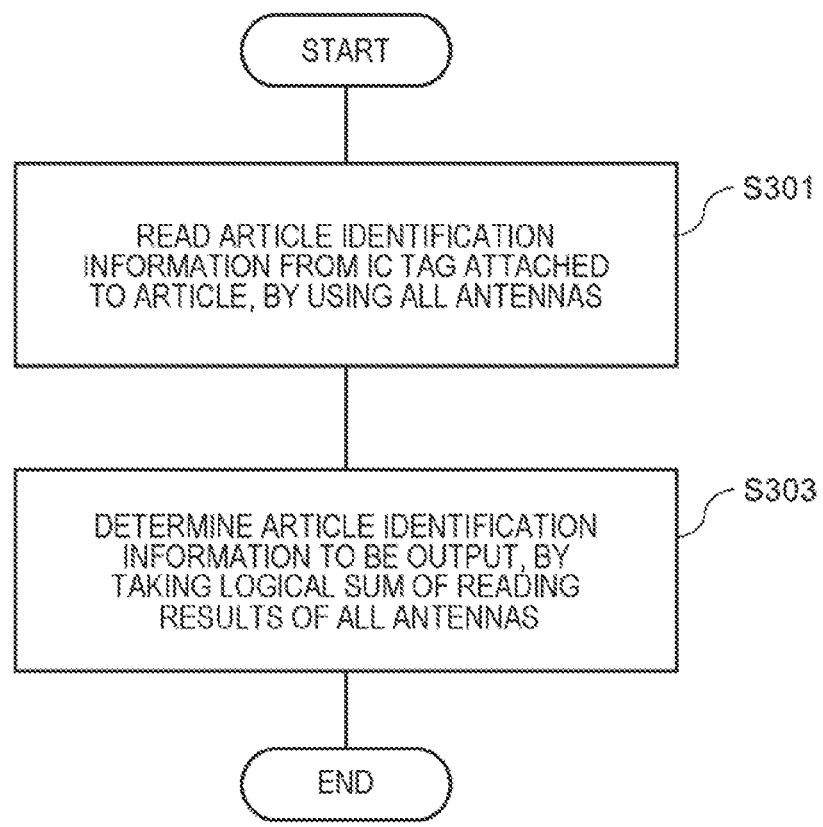
FIG. 16 is a flowchart illustrating an operation example of an article registration apparatus according to another example embodiment.

For example, as illustrated in FIG. 16, a configuration may be made in which all of a plurality of antennas 10 are operated in sequence and the article identification information 50 to be output is determined by taking a logical sum of reading results thereof. First, the control unit 106 causes the reading unit 102 to read the article identification information 50 from the IC tag 42 associated with the article 32 by operating all of a plurality of antennas 10 in sequence (step S301). Then, the determination unit 108 takes a logical sum of all pieces of the article identification information 50 read by the plurality of antennas 10, and determines the article identification information 50 to be output (step S303).

According to the configuration, the unread article identification information 50 of the article 32 can be reduced, and a risk that the article identification information 50 of the article 32 is left unread can be reduced.

Figure 17:
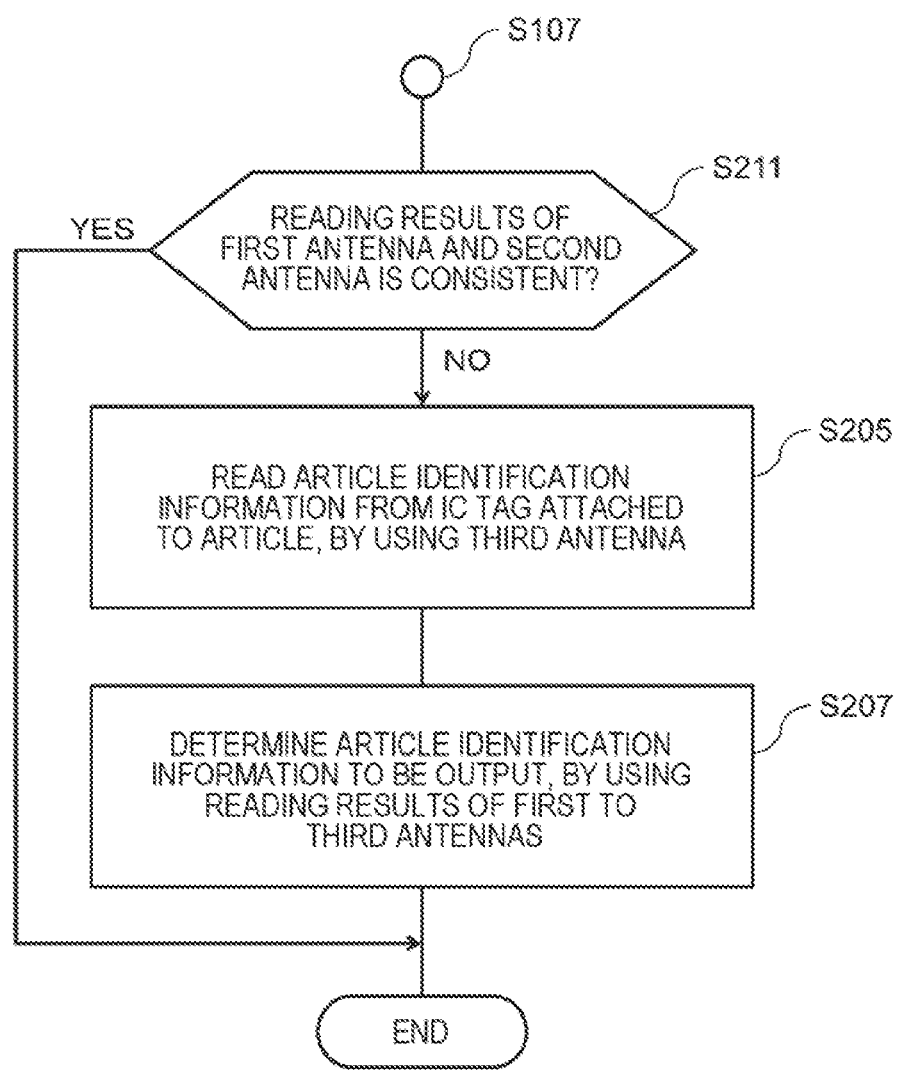
FIG. 17 is a flowchart illustrating an operation example of an article registration apparatus according to another example embodiment.

Furthermore, as illustrated in FIG. 17, the configuration according to the second example embodiment may be combined with the article registration apparatus 100 according to the first example embodiment. In place of processing of determining article identification information in step S107 in FIG. 8, following processing may be performed. In other words, the judgement unit 104 judges whether reading results by first and second antennas are consistent with each other (step S211), and, when consistent (YES in step S211), the determination unit 108 employs the article identification information 50 read by the first antenna as a correct reading result, outputs the determined article identification information 50, and ends the present processing. On the other hand, when the reading results are not consistent (NO in step S211), steps S205 and S207 in FIG. 10 according to the second example embodiment are executed. In other words, the control unit 106 causes the reading unit 102 to read again by using a third antenna, and the determination unit 108 determines the article identification information 50 to be output, by using reading results of the first to third antennas.

Further, in the above example embodiments, a user is caused to input the number of products to be purchased after reading of the IC tag 42. However, a user may be caused to input the number of products to be purchased before reading of the IC tag 42. For example, the number-of-items input screen 320 in FIG. 15 may be displayed on the display 203 before reading of the IC tag 42 is started, and a user may be caused to input the number of products to be purchased. Then, the judgement unit 104 may repeat reading while sequentially increasing the antennas 10 until the input number is consistent with the number of pieces of the article identification information 50 read by the reading unit 102.

Alternatively, the article registration apparatus 100 may further include a notification unit (not illustrated) that notifies a store clerk when an input number is not consistent with the number of pieces of the article identification information 50 determined by the determination unit 108 even after reading using all the antennas 10 is executed. For example, the notification unit may transmit a message to a portable terminal (not illustrated) carried by a store clerk, or may output a ringing tone from a speaker (not illustrated) of the article registration apparatus 100. Alternatively, the notification unit may display, on the display 203, a message instructing a user to call a store clerk because of inconsistency in numbers.

While the invention of the present application has been described with reference to the example embodiments and the examples, the invention of the present application is not limited to the above example embodiments and the examples. Various modifications that can be understood by those skilled in the art can be made to the configurations and details of the invention of the present application within the scope of the invention of the present application. Note that, acquisition and usage of information relating to a user shall be performed in a lawful manner in the present invention.

The whole or part of the above-described example embodiments can be described as, but not limited to, the following supplementary notes.

1. An article registration apparatus communicating with an integrated circuit (IC) tag associated with an article, including:
   a reading unit that reads article identification information from the IC tag associated with the article by using at least one of a plurality of antennas;
   a control unit that controls the reading unit;
   a judgement unit that judges whether a reading result of the article identification information by the reading unit satisfies a criterion; and
   a determination unit that determines the article identification information read by the reading unit, wherein the control unit causes the reading unit to read the article identification information by using a first of the antenna, the judgement unit judges whether a reading result using the first antenna satisfies the criterion,
   the control unit causes the reading unit to read the article identification information by using a second antenna different from the first antenna when a reading result using the first antenna is judged as satisfying the criterion, and
   the determination unit determines the article identification information to be output, by using the article identification information read by using the first antenna and the article identification information read by using the second antenna.

2. The article registration apparatus according to supplementary note 1, wherein
   the criterion includes that at least two of a plurality of pieces of the article identification information read by using a first antenna are identical.

3. The article registration apparatus according to supplementary note 1 or 2, wherein
   the control unit causes the reading unit to read the article identification information by using a first antenna and a second antenna,
   the judgement unit judges whether reading results of the first antenna and the second antenna are consistent with each other,
   the control unit
      causes the reading unit to end reading of the article identification information when the reading results are judged as consistent with each other, and
      causes the reading unit to read the article identification information further by using a third antenna when the reading results are judged as inconsistent with each other, and
   the determination unit determines the article identification information to be output, by using the article identification information read by using the first antenna, the second antenna, and the third antenna.

4. An article registration apparatus communicating with an IC tag associated with an article, including:
   a reading unit that reads article identification information from the IC tag associated with the article by using a plurality of antennas;
   a control unit that controls the reading unit;
   a judgement unit that judges whether a reading result of the article identification information by the reading unit satisfies a criterion; and
   a determination unit that determines the article identification information read by the reading unit, wherein
   the control unit causes the reading unit to read the article identification information by using a first antenna and a second antenna,
   the judgement unit judges whether reading results of the first antenna and the second antenna are consistent with each other,
   the control unit
      causes the reading unit to end reading of the article identification information when the reading results are judged as consistent with each other, and
      causes the reading unit to read the article identification information further by using a third antenna when the reading results are judged as inconsistent with each other, and
   the determination unit determines the article identification information to be output, by using the article identification information read by using the first antenna, the second antenna, and the third antenna.

5. The article registration apparatus according to any one of supplementary notes 1 to 4, wherein
   the plurality of antennas are provided at least under a placement position of the article and in at least one side of lateral sides of the placement position of the article.

6. The article registration apparatus according to supplementary note 5, wherein
   the control unit causes the reading unit to
      read the article identification information first by using, as the first antenna, an antenna provided under a placement position of the article, and
      read the article identification information next by using, as the second antenna, an antenna installed in at least one side of lateral sides and a top side of a placement position of the article.

7. The article registration apparatus according to supplementary note 6, wherein
   the control unit causes the reading unit to read the article identification information by using all remaining antennas other than the first antenna used for first reading the article identification information.

8. The article registration apparatus according to supplementary note 7, wherein
   the determination unit determines the article identification information to be output, by taking a logical sum of the article identification information read from the IC tag by using the first antenna and all the remaining antennas.

9. A data processing method of an article registration apparatus, including:
   by an article registration apparatus communicating with an integrated circuit (IC) tag associated with an article, including a reading unit that reads article identification information from the IC tag associated with the article by using at least one of a plurality of antennas;
   by the article registration apparatus,
   causing the reading unit to read the article identification information by using a first of the antenna;
   judging whether a reading result using the first antenna satisfies a criterion;
   causing the reading unit to read the article identification information by using a second antenna different from the first antenna when a reading result using the first antenna is judged as satisfying the criterion; and
   determining the article identification information to be output, by using the article identification information read by using the first antenna and the article identification information read by using the second antenna.

10. The data processing method of the article registration apparatus according to supplementary note 9, wherein
the criterion includes that at least two of a plurality of pieces of the article identification information read by using a first antenna are identical.

11. The data processing method of the article registration apparatus according to supplementary note 9 or 10, further including:
by the article registration apparatus,
causing the reading unit to read the article identification information by using a first antenna and a second antenna;
judging whether reading results of the first antenna and the second antenna are consistent with each other;
causing the reading unit to end reading of the article identification information when the reading results are judged as consistent with each other;
causing the reading unit to read the article identification information further by using a third antenna when the reading results are judged as inconsistent with each other; and
determining the article identification information to be output, by using the article identification information read by using the first antenna, the second antenna, and the third antenna.

12. A data processing method of an article registration apparatus, including:
by an article registration apparatus communicating with an IC tag associated with an article,
including a reading unit for reading article identification information from the IC tag associated with the article by using a plurality of antennas;
by the article registration apparatus,
causing the reading unit to read the article identification information by using a first antenna and a second antenna;
judging whether reading results of the first antenna and the second antenna are consistent with each other;
causing the reading unit to end reading of the article identification information when the reading results are judged as consistent with each other;
causing the reading unit to read the article identification information further by using a third antenna when the reading results are judged as inconsistent with each other; and
determining the article identification information to be output, by using the article identification information read by using the first antenna, the second antenna, and the third antenna.

13. The data processing method of the article registration apparatus according to any one of supplementary notes 9 to 12, wherein
the plurality of antennas are provided at least under a placement position of the article and in at least one side of lateral sides of the placement position of the article.

14. The data processing method of the article registration apparatus according to supplementary note 13, further including,
by the article registration apparatus,
causing the reading unit to
read the article identification information first by using, as the first antenna, an antenna provided under a placement position of the article, and
read the article identification information next by using, as the second antenna, an antenna installed in at least one side of lateral sides and a top side of a placement position of the article.

15. The data processing method of the article registration apparatus according to supplementary note 14, further including,
by the article registration apparatus,
causing the reading unit to read the article identification information by using all remaining antennas other than the first antenna used for first reading the article identification information.

16. The data processing method of the article registration apparatus according to supplementary note 15, further including,
by the article registration apparatus,
determining the article identification information to be output, by taking a logical sum of the article identification information read from the IC tag by using the first antenna and all the remaining antennas.

17. A program for causing a computer achieving an article registration apparatus communicating with an integrated circuit (IC) tag associated with an article, the article registration apparatus including
a reading unit that reads article identification information from the IC tag associated with the article by using at least one of a plurality of antennas,
the program for causing a computer to execute:
a procedure of causing the reading unit to read the article identification information by using a first of the antenna;
a procedure of judging whether a reading result using the first antenna satisfies a criterion;
a procedure of causing the reading unit to read the article identification information by using a second antenna different from the first antenna when a reading result using the first antenna is judged as satisfying the criterion; and
a procedure of determining the article identification information to be output, by using the article identification information read by using the first antenna and the article identification information read by using the second antenna.

18. The program according to supplementary note 17, wherein
the criterion includes that at least two of a plurality of pieces of the article identification information read by using a first antenna are identical.

19. The program according to supplementary note 17 or 18, for further causing a computer to execute:
a procedure of causing the reading unit to read the article identification information by using a first antenna and a second antenna;
a procedure of judging whether reading results of the first antenna and the second antenna are consistent with each other;
a procedure of causing the reading unit to end reading of the article identification information when the reading results are judged as consistent with each other;
a procedure of causing the reading unit to read the article identification information further by using a third antenna when the reading results are judged as inconsistent with each other; and
a procedure of determining the article identification information to be output, by using the article identification information read by using the first antenna, the second antenna, and the third antenna.

20. A program for causing a computer achieving an article registration apparatus communicating with an IC tag associated with an article, the article registration apparatus including a reading unit that reads article identification information from the IC tag associated with the article by using a plurality of antennas,
the program for causing a computer to execute:
a procedure of causing the reading unit to read the article identification information by using a first antenna and a second antenna;
a procedure of judging whether reading results of the first antenna and the second antenna are consistent with each other;
a procedure of causing the reading unit to end reading of the article identification information when the reading results are judged as consistent with each other;
a procedure of causing the reading unit to read the article identification information further by using a third antenna when the reading results are judged as inconsistent with each other; and
a procedure of determining the article identification information to be output, by using the article identification information read by using the first antenna, the second antenna, and the third antenna.

21. The program according to any one of supplementary notes 17 to 20, wherein
the plurality of antennas are provided at least under a placement position of the article and in at least one side of lateral sides of the placement position of the article.

22. The program according to supplementary note 21, for further causing a computer to execute:
a procedure of causing the reading unit to
read the article identification information first by using, as the first antenna, an antenna provided under a placement position of the article; and
a procedure of causing the reading unit to
read the article identification information next by using, as the second antenna, an antenna installed in at least one side of lateral sides and a top side of a placement position of the article.

23. The program according to supplementary note 22, for further causing a computer to execute
a procedure of causing the reading unit to read the article identification information by using all remaining antennas other than the first antenna used for first reading the article identification information.

24. The program according to supplementary note 23, for further causing a computer to execute
a procedure of determining the article identification information to be output, by taking a logical sum of the article identification information read from the IC tag by using the first antenna and all the remaining antennas.

This application is based upon and claims the benefit of priority from Japanese patent application No. 2020-022231, filed on Feb. 13, 2020, the disclosure of which is incorporated herein in its entirety by reference.

REFERENCE SIGNS LIST

1 Sales system
10, 10a, 10b, 10c, 10d, 10e Antenna
20 Enclosure
22 Recess
30 Shopping basket
32 Article
40 Tag
42 IC tag
50 Article identification information
52 Article code
54 Serial number
60 RFID tag
62 Antenna
64 IC chip
66 Memory
68 Communication unit
100 Article registration apparatus
102 Reading unit
104 Judgement unit
106 Control unit
108 Determination unit
110 Storage apparatus
202 Display processing unit
203 Display
204 Operation acceptance unit
206 Settlement processing unit
210 Product DB
300 Confirmation screen
302 Product list
304 Number-of-items confirmation message display section
306 YES button
308 NO button
320 Number-of-items input screen
322 Input instruction display section
324 Number-of-items input section
326 Input confirmation message display section
328 OK button
1000 Computer
1010 Bus
1020 Processor
1030 Memory
1040 Storage device
1050 Input/output interface
1060 Network interface

What is claimed is:

1. An article registration apparatus communicating with an integrated circuit (IC) tag associated with an article, comprising:
a reading unit that reads article identification information from the IC tag associated with the article by using at least one of a plurality of antennas;
at least one memory configured to store instructions; and
at least one processor configured to execute the instructions to:
control the reading unit;
judge whether a reading result of the article identification information by the reading unit satisfies a criterion; and
determine the article identification information read by the reading unit, wherein
the at least one processor is configured to execute the instructions to:
cause the reading unit to read the article identification information by using a first antenna of the plurality of antennas;
judge whether a reading result using the first antenna satisfies the criterion;
cause the reading unit to read the article identification information by using a second antenna different from the first antenna when the reading result using the first antenna is judged as satisfying the criterion; and
determine the article identification information to be output, by using the article identification information read by using the first antenna and the article identification information read by using the second antenna.

2. The article registration apparatus according to claim 1, wherein
the criterion includes that at least two of a plurality of pieces of the article identification information read by the first antenna are identical.

3. The article registration apparatus according to claim 1, wherein the at least one processor is configured to further execute the instructions to:
cause the reading unit to read the article identification information by the first antenna and the second antenna;
judge whether reading results of the first antenna and the second antenna are consistent with each other;
cause the reading unit to end reading of the article identification information when the reading results are judged as consistent with each other;
cause the reading unit to read the article identification information further by using a third antenna when the reading results are judged as inconsistent with each other; and
determine the article identification information to be output, by using the article identification information read by using the first antenna, the second antenna, and the third antenna.

4. The article registration apparatus according to claim 1, wherein
the plurality of antennas are provided at least under a placement position of the article and in at least one side of lateral sides of the placement position of the article.

5. The article registration apparatus according to claim 4, wherein
the at least one processor is configured to further execute the instructions to:
cause the reading unit to read the article identification information first by using, as the first antenna, an antenna provided under a placement position of the article; and
cause the reading unit to read the article identification information next by using, as the second antenna, at least an antenna installed in at least one side of lateral sides and a top side of the placement position of the article.

6. The article registration apparatus according to claim 5, wherein
the at least one processor is configured to further execute the instructions to:
cause the reading unit to read the article identification information by using all remaining antennas other than the first antenna.

7. The article registration apparatus according to claim 6, wherein
the at least one processor is configured to further execute the instructions to:
determine the article identification information to be output, by taking a logical sum of the article identification information read from the IC tag by using the first antenna and all the remaining antennas.

8. The article registration apparatus according to claim 1, wherein
the at least one processor is configured to further execute the instructions to:
determine the article identification information to be output, by taking a logical sum of the article identification information read from the IC tag by using the plurality of antennas.

9. A data processing method of an article registration apparatus, comprising:
communicating with an integrated circuit (IC) tag associated with an article using an article registration apparatus, wherein the article registration apparatus includes;
a reading unit that reads article identification information from the IC tag associated with the article by using at least one of a plurality of antennas of the reader unit;
causing, using the article registration apparatus, the reading unit to read the article identification information by using a first antenna of the plurality of antennas;
judging, using the article registration apparatus, whether a reading result using the first antenna satisfies a criterion;
causing, using the article registration apparatus, the reading unit to read the article identification information by using a second antenna different from the first antenna when the reading result using the first antenna is judged as satisfying the criterion; and
determining, using the article registration apparatus, the article identification information to be output, by using the article identification information read by using the first antenna and the article identification information read by using the second antenna.

10. The data processing method of the article registration apparatus according to claim 9, wherein
the criterion includes that at least two of a plurality of pieces of the article identification information read by the first antenna are identical.

11. The data processing method of the article registration apparatus according to claim 9, further comprising:
causing, using the article registration apparatus, the reading unit to read the article identification information by the first antenna and the second antenna;
judging, using the article registration apparatus, whether reading results of the first antenna and the second antenna are consistent with each other;
causing, using the article registration apparatus, the reading unit to end reading of the article identification information when the reading results are judged as consistent with each other;
causing, using the article registration apparatus, the reading unit to read the article identification information further by using a third antenna when the reading results are judged as inconsistent with each other; and
determining, using the article registration apparatus, the article identification information to be output, by using the article identification information read by using the first antenna, the second antenna, and the third antenna.

12. The data processing method of the article registration apparatus according to claim 9, wherein
the plurality of antennas are provided at least under a placement position of the article and in at least one side of lateral sides of the placement position of the article.

13. The data processing method of the article registration apparatus according to claim 12, further comprising,
causing, using the article registration apparatus, the reading unit to:
read the article identification information first by using, as the first antenna, an antenna provided under a placement position of the article, and
read the article identification information next by using, as the second antenna, at least an antenna installed in at least one side of lateral sides and a top side of the placement position of the article.

14. The data processing method of the article registration apparatus according to claim 13, further comprising, causing, using the article registration apparatus, the reading unit to read the article identification information by using all remaining antennas other than the first antenna.

15. The data processing method of the article registration apparatus according to claim 14, further comprising, determining, using the article registration apparatus, the article identification information to be output, by taking a logical sum of the article identification information read from the IC tag by using the first antenna and all the remaining antennas.

16. The data processing method of the article registration apparatus according to claim 9, further comprising,
determining, using the article registration apparatus, the article identification information to be output, by taking a logical sum of the article identification information read from the IC tag by using the plurality of antennas.

17. A non-transitory computer-readable storage medium storing a program for causing a computer achieving an article registration apparatus communicating with an integrated circuit (IC) tag associated with an article, the article registration apparatus including
a reading unit that reads article identification information from the IC tag associated with the article by using at least one of a plurality of antennas,
the program for causing a computer to execute:
a procedure of causing the reading unit to read the article identification information by using a first antenna of the plurality of antennas;
a procedure of judging whether a reading result using the first antenna satisfies a criterion;
a procedure of causing the reading unit to read the article identification information by using a second antenna different from the first antenna when the reading result using the first antenna is judged as satisfying the criterion; and
a procedure of determining the article identification information to be output, by using the article identification information read by using the first antenna and the article identification information read by using the second antenna.

18. The non-transitory computer-readable storage medium according to claim 17, wherein
the criterion includes that at least two of a plurality of pieces of the article identification information read by the first antenna are identical.

19. The non-transitory computer-readable storage medium program according to claim 17, wherein the program further causes a computer to execute:
a procedure of causing the reading unit to read the article identification information by the first antenna and the second antenna;
a procedure of judging whether reading results of the first antenna and the second antenna are consistent with each other;
a procedure of causing the reading unit to end reading of the article identification information when the reading results are judged as consistent with each other;
a procedure of causing the reading unit to read the article identification information further by using a third antenna when the reading results are judged as inconsistent with each other; and
a procedure of determining the article identification information to be output, by using the article identification information read by using the first antenna, the second antenna, and the third antenna.

20. The non-transitory computer-readable storage medium according to claim 17, wherein
the plurality of antennas are provided at least under a placement position of the article and in at least one side of lateral sides of the placement position of the article.

* * * * *